June 24, 1969   R. O. ENGH   3,451,759
NONINTERFERING SPARK IGNITER AND ULTRAVIOLET
SENSITIVE FLAME DETECTOR
Filed Oct. 30, 1967

*INVENTOR.*
ROBERT O. ENGH
BY
ATTORNEY.

United States Patent Office 3,451,759
Patented June 24, 1969

3,451,759
NONINTERFERING SPARK IGNITER AND ULTRA-VIOLET SENSITIVE FLAME DETECTOR
Robert O. Engh, Hopkins, Minn., assignor to Honeywell Inc., Minneapolis, Minn., a corporation of Delaware
Filed Oct. 30, 1967, Ser. No. 679,065
Int. Cl. F23n 5/08; G01t 1/16; H01j 39/12
U.S. Cl. 431—79                          5 Claims

ABSTRACT OF THE DISCLOSURE

A spark igniter and ultraviolet sensitive flame detector are energized from a common source of AC voltage by means of diodes which render the igniter and detector operative on opposite half cycles of the AC source, to prevent interference between the ultraviolet radiation present in the spark and in a flame.

Background of the invention

In the art of fuel burners and controls the problem of interference between ultraviolet radiation present in flame and ignition spark has usually been solved by two prior art structures. The first structure mounts the ultraviolet flame detector so that it views the flame radiation, but does not view the spark radiation. This first structure requires a particular installtaion, not always desirable or possible. The second structure utilizes a motor driven program burner control wherein sequentially controlled switches first energize both the fuel valve and the spark igniter to establish flame, and then, during a subsequent period, the spark igniter is deenergized, leaving only the fuel valve energized. The flame detector is operative to perform a control function only during this subsequent period when the ultraviolet radiation, if present, must be originating from a flame since the igniter is deenergized. U.S. Patent 2,989,117 to D. L. Graves is an example of the last-mentioned structure. This structure requires an expensive type burner control.

Summary of the invention

The present invention utilizes a spark igniter which is constructed and arranged to produce a spark only during reoccurring first intervals, the spark being absent during intervening second intervals. This spark igniter is combined with flame detecting means which is constructed and arranged to be sensiitve to electromagnetic radiation only during the second intervals. Thus, there is no interference between radiation from the spark and radiation from the flame.

More specifically, the igniter and detector are energized from a common source of AC voltage, the phasing of the connections being such as to establish the above mentioned first and second intervals, which are the half cycles of the AC source. Also, the detector is sensitive to the ultraviolet radiation, such radiation being common to a spark and a flame.

Description of the preferred embodiment

Figure 1:
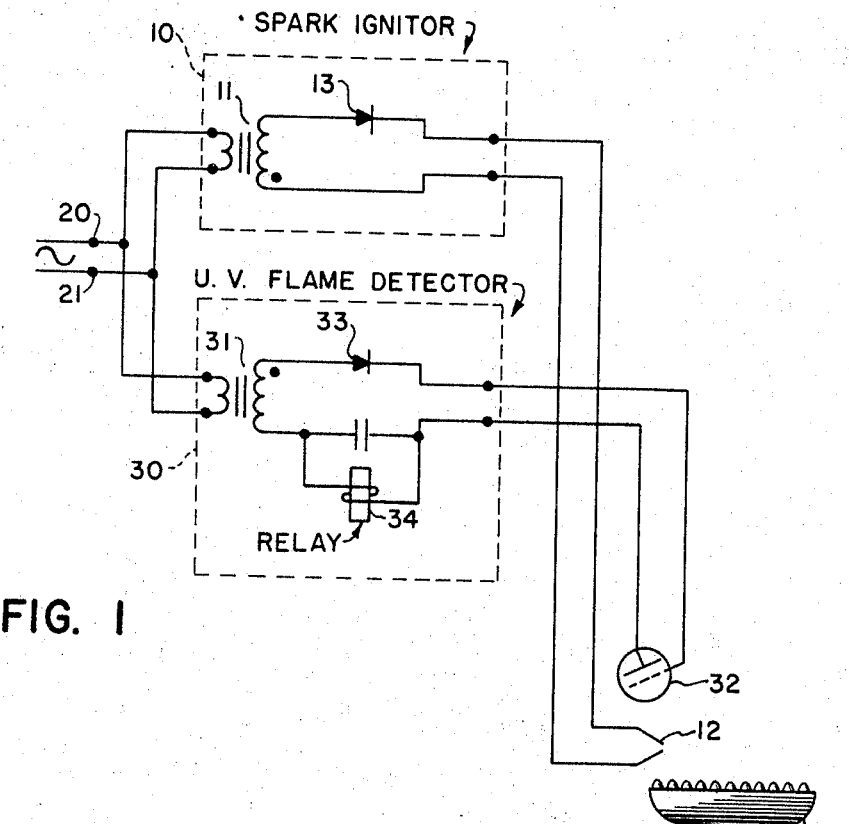
FIGURE 1 is a schematic showing of a preferred embodiment of my invention.

Referring to FIGURE 1, reference numeral 10 designates a spark igniter utilizing a step-up transformer 11 whose secondary winding is adapted to be connected in circuit with a pair of spark ignition electrodes 12. This connection is completed through a high voltage diode 13. Diode 13 may, for example, be a high voltage vacuum diode capable of handling voltages of a magnitude sufficient to produce an ignition spark at electrodes 12.

Electrodes 12 are associated with a fuel burner 13 to ignite the fuel flowing from the burner. For simplicity, I have not shown a complete burner control system, it being recognized that the manner of controlling fuel flow and supervising proper operation of the burner is not critical to my invention. Furthermore, the exact structure of spark igniter 10 is not critical. It is essential to the practicing of my invention that the spark igniter be constructed and arranged to generate a reoccurring spark-producing-voltage at a given frequency, which voltage exists for a first period of spark-producing-voltage, followed by a period when the spark-producing-voltage is absent. In the preferred embodiment of FIGURE 1, these first and second periods are achieved by virtue of the connection of the primary winding of transformer 11 to terminals 20 and 21, these terminals being adapted to be connected to a source of AC voltage. The first and second periods are alternate half cycles of the AC source.

Spark igniters having a similar property to that disclosed in FIGURE 1 are also shown in U.S. Patent 3,238,-992 issued to N. A. Forbes and 3,318,358 issued to W. F. Potts.

Reference numeral 30 designates an ultraviolet flame detector having a step-up transformer 31 which is adapted to be connected to an ultraviolet sensitive Geiger tube 32. Diode 33 and relay 34 connect tube 32 to the secondary winding. I have elected not to show the switch contacts of relay 34 and the manner in which these switch contacts are connected into a burner control system. Many burner control systems are well known in the art and it is sufficient to state that relay 34 is a flame relay which is energized upon the presence of flame at burner 12.

My invention does not require a critical physical relationship between burner 13, ignition electrode 12 and tube 32. Tube 32 will, in most cases, be located such that ultraviolet radiation from spark 12 and ultraviolet radiation from the flame present at burner 13 will both impinge upon tube 32. The tube would respond equally well to ultraviolet radiation from either source, were it not for my invention.

Referring again to tube 32, it will be noted that diode 33 is poled to apply operating voltage to tube 32 only when the upper terminal of the secondary winding of transformer 31 is positive. The primary winding of this transformer is connected to terminals 20 and 21.

The phasing of the connection of the primary windings of transformers 11 and 31 must be selected such that the bottom terminal of the secondary winding of transformer 11 is positive during the half-cycle of the AC source in which the upper terminal of the secondary winding of transformer 31 is positive. Thus, it can be seen that during this half-cycle, diode 33 is effective to apply operating voltage to tube 32 and ultraviolet radiation can be detected. However, during this same half-cycle, diode 13 prevents the application of a spark-producing-voltage to electrodes 12 and no spark, thus no ultraviolet radiation is produced at these electrodes.

On the next half-cyle, diode 33 is effective to render tube 32 insensitive to radiation, and diode 13 is effective to apply a spark-producing-voltage at electrodes 12. Thus, at reoccurring intervals and at the frequency of the AC source, a spark is produced at electrodes 12, out of phase with the periods during which tube 32 is sensitive to radiation.

The construction of flame detector 30 is not critical to the practicing of my invention. It is however necessary in carrying out my invention that the flame detector be constructed and arranged to be sensitive to an electromagnetic radiation which is common to a spark and to a flame (ultraviolet radiation), and that the flame detector be further constructed and arranged to be sensitive to this radiation at reoccurring periods, at the same frequency as the periods for operation of spark igniter 10, and furthermore, the operativeness of the flame detector must be out of phase with the operativeness of the spark igniter. This is achieved by the phasing of the connection of the primary windings of transformers 11 and 31 to terminals 20 and 21. U.S. Patents 3,189,743 issued to J. B. Johnson et al., and 3,336,479 issued to J. C. Blackett are examples of ultraviolet flame detectors having the characteristics of reoccurring periods of sensitivity.

Tube 32 may be shown in U.S. Patent 3,344,302 on which I am a joint inventor with R. G. Johnson.

Figure 2:
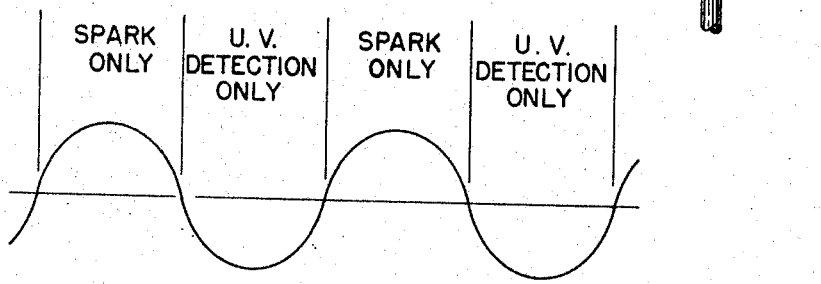
FIGURE 2 is a graph of the AC source, showing the above mentioned first and second intervals.

FIGURE 2 is a showing of the sine wave characteristic of the source of AC voltage to which terminals 20 and 21 are adapted to be connected. As shown in FIGURE 2, only during alternative half-cycles of this sine wave is a spark produced, and only during the intervening half cycles is UV radiation detected.

The embodiments of the invention in which an exclusive property or right is claimed are defined as follows:

1. Noninterfering spark ignition means and flame detecting means for use with a fuel burner to ignite fuel at the burner and to detect flame at the burner, without interference between the electromagnetic radiaion produced by the ignition spark and the electromagnetic radiation produced by the flame, comprising;

spark ignition means constructed and arranged to generate a recurring spark producing voltage at a given frequency, which voltage consists of a first period of spark producing voltage followed by a second period wherein the spark producing voltage is absent, and flame detecting means constructed and arranged to be sensitive to an electromagnetic radiation which is common to a spark and to a flame, and further constructed and arranged to be sensitive to said radiation at recurring periods of said given frequency to render the flame detecting means insensitive to said radiation during said first period and sensitive to said radiation during said second period.

2. Noninterfering spark ignition means and flame detecting means as defined in claim 1 wherein said common electromagnetic radiation is ultraviolet radiation, and said flame detecting means is constructed and arranged to detect ultraviolet radiation.

3. Noninterfering spark ignition means and flame detecting means as defined in claim 1, wherein said ignition means and said detecting means are adapted to be energized from a source of AC voltage and the said first and second periods are determined by the phasing of said energization, including means connecting said ignition means and said detecting means to terminals to insure proper phasing, said terminals being adapted to be connected to the source of AC voltage.

4. Noninterfering spark ignition means and flame detecting means as defined in claim 3 wherein said first and second preiods are alternate half waves of the AC source.

5. Noninterfering spark ignition means and flame detecting means as defined in claim 4 wherein said flame detecting means is constructed and arranged to detect ultraviolet electromagnetic radiation.

References Cited

UNITED STATES PATENTS

| | | | |
|---|---|---|---|
| 3,002,550 | 10/1961 | Schreter | 431—26 X |
| 3,238,992 | 3/1966 | Forbes | 431—69 X |
| 3,286,761 | 11/1966 | Engh | 431—26 |

FREDERICK KETTERER, *Primary Examiner.*

U.S. Cl. X.R.

250—83.3, 215